US006377586B1

United States Patent
Seo et al.

(10) Patent No.: US 6,377,586 B1
(45) Date of Patent: Apr. 23, 2002

(54) TIME SWITCHING CIRCUIT OF SYNCHRONOUS SUPER HIGH SPEED TRANSMISSION APPARATUS AND CONTROLLING METHOD THEREOF

(75) Inventors: Jung-Kon Seo; Ji-hoon Bang, both of Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/153,025

(22) Filed: Sep. 15, 1998

(51) Int. Cl.[7] .................................................. H04J 3/06
(52) U.S. Cl. ........................ 370/442; 370/412; 370/465; 370/505; 370/509
(58) Field of Search ................................ 370/218, 280, 370/282, 412, 442, 458, 465, 468, 470, 505, 506, 509, 510, 512, 413, 414, 415, 416, 417, 418

(56) References Cited

U.S. PATENT DOCUMENTS 5,428,612 A * 6/1995 Scheffel et al. ............. 370/505
5,555,262 A * 9/1996 Urbansky ................... 370/505
5,590,118 A * 12/1996 Nederlof ..................... 370/218
5,777,998 A * 7/1998 Traverso et al. ............ 370/509

* cited by examiner

*Primary Examiner*—Douglas Olms
*Assistant Examiner*—Shick Hom
(74) *Attorney, Agent, or Firm*—Sughrue Mion, PLLC

(57) ABSTRACT

A memory saving type time switching circuit of a synchronous super high speed transmission apparatus for saving required memory by switching data based on data properties being received by a synchronous super high speed transmission apparatus. A frame information signal generating portion receives data that is to be switched and generates count signals for data switching. A record control portion stores received data to a switching memory portion according to received data type using a predetermined rule. According to received data types and switching information from the central processing unit, a connection information generator reads the switching memory portion using a predetermined rule. According to read data types from the switching memory portion, an output time point compensation portion compensates an output point. In the present invention, saving of required memories for data switching by considering data properties and optimizing system structure and operation by treating data switching in one board are possible.

7 Claims, 14 Drawing Sheets

FIG. 12

| A1 | A4 | A7 | A10 | A13 | A16 | A19 |
|---|---|---|---|---|---|---|
| A22 | A25 | A28 | A31 | A34 | A37 | A40 |
| A43 | A46 | A49 | A52 | A55 | A58 | A61 |
| A64 | A67 | A70 | A73 | A76 | A79 | A82 |

—TUG-2

| A2 | A5 | A8 | A11 | A14 | A17 | A20 |
|---|---|---|---|---|---|---|
| A23 | A26 | A29 | A32 | A35 | A38 | A41 |
| A44 | A47 | A50 | A53 | A56 | A59 | A62 |
| A65 | A68 | A71 | A74 | A77 | A80 | A83 |

—TUG-2

| A3 | A6 | A9 | A12 | A15 | A18 | A21 |
|---|---|---|---|---|---|---|
| A24 | A27 | A30 | A33 | A36 | A39 | A42 |
| A45 | A48 | A51 | A54 | A57 | A60 | A63 |
| A66 | A69 | A72 | A75 | A78 | A81 | A84 |

—TUG-2

TUG-3

FIG. 13

| B1 | B4 | B7 | B10 | B13 | B16 | B19 |
|----|----|----|-----|-----|-----|-----|
| B22 | B25 | B28 | B31 | B34 | B37 | B40 |
| B43 | B46 | B49 | B52 | B55 | B58 | B61 |
| | | | | | | |

| B2 | B5 | B8 | B11 | B14 | B17 | B20 |
|----|----|----|-----|-----|-----|-----|
| B23 | B26 | B29 | B32 | B35 | B38 | B41 |
| B44 | B47 | B50 | B53 | B56 | B59 | B62 |
| | | | | | | |

| B3 | B6 | B9 | B12 | B15 | B18 | B21 |
|----|----|----|-----|-----|-----|-----|
| B24 | B27 | A30 | B33 | B36 | B39 | B42 |
| B45 | B48 | B51 | B54 | B57 | B60 | B63 |
| | | | | | | |

FIG. 14

| A1 | B1 | A4 | A7 | A10 | B4 | A13 |
|---|---|---|---|---|---|---|
| A16 | B7 | A19 | A22 | A25 | B10 | A28 |
| A31 | B13 | A34 | A37 | A40 | B16 | A43 |
| A46 |  | A49 | A52 | A55 |  | A58 |

TUG-2

| A2 | B2 | A5 | A8 | A11 | B5 | A14 |
|---|---|---|---|---|---|---|
| A17 | B8 | A20 | A23 | A26 | B11 | A29 |
| A32 | B14 | A35 | A38 | A41 | B17 | A44 |
| A47 |  | A50 | A53 | A56 |  | A59 |

TUG-2

| A3 | B3 | A6 | A9 | A12 | B6 | A15 |
|---|---|---|---|---|---|---|
| A18 | B9 | A21 | A24 | A27 | B12 | A30 |
| A33 | B15 | A36 | A39 | A42 | B18 | A45 |
| A48 |  | A51 | A54 | A57 |  | A60 |

TUG-2

TUG-3

TIME SWITCHING CIRCUIT OF SYNCHRONOUS SUPER HIGH SPEED TRANSMISSION APPARATUS AND CONTROLLING METHOD THEREOF

BACKGROUND OF THE INVENTION

1. Field of the Invention

The present invention relates to a switching circuit, and more particularly, relates to a memory saving type time switching circuit of a synchronous super high speed transmission apparatus for reducing required memory by switching data considering data properties which is received by the synchronous super high speed transmission apparatus.

2. Description of the Related Art

Recently, research for information communication networks started. One field of this research is a B-ISDN (Integrated Services Digital Network).

The B-ISDN (Integrated Services Digital Network) includes an User Network Interface (hereinafter referred to as a UNI) and a Network Node Interface (hereinafter referred to as NNI) for broadband service.

The communication hierarchy used for these two interfaces was unified to a SDH(Synchronous Digital Hierarchy) from American and European types around 1990. In the SDH, subscribers' data is multiplexed and transmitted through a communication line of an STM-1(Synchronous Transport Module, hereinafter it will be referred to as a STM) to an STM-4, and switched according to the SDH. Generally, signals of the STM-1 are multiplexed by 8 bits (1 byte) in turn, and such a multiplexing method is called byte interleaving.

FIG. 1 illustrates a whole aspect of a synchronous multiplexing structure related to the hierarchy signals in the SDH and the numerals in parentheses in FIG. 1 illustrate the number of signals required to related multiplexing. The synchronous multiplexing process is illustrated in a dotted-box represented with SM (Synchronous Multiplexing) and an asynchronous multiplexing process is illustrated in a left-sided dotted-box represented with AM (Asynchronous Multiplexing).

The first step of the synchronous multiplexing process is that each hierarchy signal is mapped in a predetermined container(C). At this time, a bit-unit positive, zero and negative justifications, or positive justification are used for synchronizing. When a section overhead is added to a container, it becomes a VC (Virtual Container) and when a pointer (PTR) is added to a VC, it becomes a TU (Tributary Unit). But, in the case of a VC-3 and a VC-4, they are directly mapped to the STM-1 omitting other VC, the TU becomes an AU(Administrative Unit). At this time, numeral m (=1, 2, 3, 4) attached to each signal unit represents that the bit ratio of each signal unit corresponds to a DS-m grade. If m=1, it subdivides into 11 and 12, respectively, and represents a bit ratio corresponding to North American type DS-1 and European type DS-1E. But, the bit ratio becomes n times of 152.52 Mbps in the STM-n.

In the TU-1(TU-11 or TU-12), it grouped each four and multiplexed to the VC-3 and the VC-4 as a TUG(Tributary Unit Group) type. The TU-2 and the TU-3 are regarded the same as the TUG-2 and the TUG-3 as the same rank, respectively. The VC-3 can be multiplexed to the VC-4 via TU-3 or directly multiplexed to the AU via AU-3. An AUG (Administrative Unit Group) is regarded as AU-4 as the same rank and it becomes the STM-n signal when a SOH (Section Overhead) is attached after multiplexing n units of the AUGs.

An example of synchronous multiplexing is shown in FIG. 2. FIG. 2 illustrates a multiplexing process for paths of DS-1/C-11/VC-11/TU-11/TUG-2/TUG-3/VC-4/AU-4/AUG/STM-n that is illustrated using the thick line in FIG. 1. In FIG. 2, the DS-1 signal is first mapped to the C-11, the VC-11 is obtained by attaching a VC-11 POH to the C-11 and the TUG-2 is obtained by attaching a TU-11 PRT to the VC-11 and multiplexing them by four.

In the TUG-2 signal of FIG. 2, TU-11 PRT of each TU-11 is grouped with each TU-11 PRT. The TUG-3 is obtained by multiplexing seven units of the TUG-2s and attaching an FOH (Fixed Overhead) in front of seven units of the TUG-2. The VC-4 is obtained by multiplexing three units of the TUG-3 and attaching the FOH and the VC-4 POH (Section Overhead) in front of the three units of the TUG-3. Therefore, the VC-4 signal is the same as multiplexing 21 units of the TUG-2 and attaching the VC-4 POH and the FOH.

In multiplexing results, 84 units of the TU-11s are individually accessible on the VC-4. In the VC-4, the FOH is simply used for adapting the VC-4 size as an overhead. The AU-4 is obtained by attaching the AU-4 PRT in front of the VC-4 and it is the same as the AUG signal. The STM-n is obtained by multiplexing n units of the AUGs and attaching a section overhead on the AUG.

The contents of above-mentioned SDH hierarchy are easily understood by those who are skilled in the "Synchronous Digital Hierarchy Bit Rates CCITT Recommendation G.707" of 1992.

A Network Node Apparatus such as a Synchronous Multiplexer (SM), an ADD/Drop Multiplexer (ADM), a Digital Cross-Connect System (DCS), an Interworking Unit (IWU) and an Interface Unit (IFU) is used in a synchronous transmission network. The ADM and the DCS can give flexibility to network operation by branching and coupling synchronous transmission signals.

The late-mentioned preferred embodiments of the present invention will describe data switching of a light transmission apparatus working as an ADM.

Meanwhile, data multiplexing of the synchronous digital transmission network will be described hereinafter. Voice data of the synchronous digital transmission network generally transmits 8000 units of eight bit(1 byte) information. So, its transmission speed is 64 kbps. One line is an 8-bit unit and, especially, the time required for transmitting one byte in the voice data is called the time slot. In a digital network, a plurality of lines are sequentially multiplexed per eight bit. FIG. 3 illustrates multiplexing four lines and transmitting data and one byte is transmitted by every four periods. Like this, the frame period(To) is a period for multiplexing lines and returning to an initial state.

Because multiplexed signals wait for their order per line, data switching is executed by changing their order using a predetermined method. For example, like FIG. 3, data switching is executed by storing received digital signals in a memory, sequentially reading the digital signals to an outputting port to be transported and outputting them.

Referring to FIG. 4, the PM5371 TUDX system of the PMC-Sierra Company, generally used system for a digital switching system, includes a byte stream input portion 41 that receives byte stream that is to be switched. A switching portion 42 that temporarily stories received input stream for switching. A sequence control portion 44 that reads stored data of the switching portion 42 according to a predetermined sequence. An output formatter 45 that realigns read data of the sequence control portion 44 for outputting to an output terminal (not shown here). At this time, the switching portion 42 needs memories 43 of square-law number of the byte stream input port.

Referring to FIG. 4, operation of digital switching type will be described hereinafter. A byte (eight-bits) received data that is to be switched is consequently received and temporarily stored to memories 43 in the switching portion 42. The sequence control portion 44 inputs control signals about data for switching received data to the switching portion 42 and the output formatter 45, reads received data from the byte stream input portion 41 in the memories 43 of the switching portion 42 and outputs to the output terminal (not shown here).

The basic algorithm applied to data switching with reference to FIG. 4 includes the received data such as A, B, C, D . . . that are to be switched and temporarily stored in the switching portion 42. Reading address values for data that are to be switched are received by the switching portion 42. The temporarily stored data that is to be switched is read according to the reading address values and output to the output terminal. In other words, if the received data sequence is A, B, C and D, data is respectively switched and output D, C, B and A. The data switching method using such an algorithm is called time switching. The currently used transmission apparatus, like the ADM, uses the above-mentioned time switching methods.

The input port number(IN#) and the required memories' quantity for exchanging data using a transmission apparatus will be described hereinafter. For example, as shown in FIG. 6, four chins are required for forming a 4-ported switch by using existing 2-ported PMC chips. In forming a 4-ported switch by using 2-ported chips, $2^2$ quantities of chips are required. So, if the basic sizes of the data received to each chip ports is N bytes, $N \times 2^2$ byte-sized memories are required in each chip.

As aforementioned, in proportion to the increase of the input port number and the input data quantity, it is difficult for each chip to accommodate the memory capacity required for storing the received data.

Accordingly, for switching the STM-n that follows synchronous multiplexing structure by using an existing switching method that inputs 270 bytes and switches as shown in FIG. 1, the memory capacity of 270×IN#2 bytes and many chips are required, so, forming memories in one board is difficult.

SUMMARY OF THE INVENTION

Therefore, it is an object of the present invention to save required memory for data switching by considering data properties and optimize system structure and operation by processing data switching in one board.

According to the present invention, a memory saving type time switching circuit of a super high speed transmission apparatus inputs data that is to be switched and generates count signals for data switching through a frame information signal generating portion. According to the data types, a record control portion stores received data to a switching memory portion using a predetermined rule. According to the received data types and the switching information, a connection information generator reads the switching memory portion using a predetermined rule. According to the read data types from the switching memory portion, an output time point compensation portion compensates output points.

Preferably, when the received data is a TU-11, the predetermined rule includes accessing a switching memory portion that corresponds to a generated address during generation of four count signals and records or reads data. When the received data is a TU-12, the predetermined rule includes accessing a switching memory portion that corresponds to a generated address during generation of three count signals and records or reads data.

Preferably, the switching memory portion includes a plurality of memories for storing 84 bytes of the received data and the memory control portion for controlling recording data to the plurality of memories and data recording.

Preferably, the above-mentioned switching memory portion reads one memory during recording one memory according to the signals generated from the memory control portion.

Preferably, according to the output time compensation rule, the output time point compensation portion compensates time difference generated by shifting for adjusting time slot data from three units of the TU-12 type to four units of the TU-11 type and recording and outputting it.

More preferably, the output time compensation rule outputs one byte of data that is to be read and outputs after delaying, during generation of seven count signals in a TUG-3 level.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein:

FIG. 12 illustrates stored structure of the TU-11 data in a switching memory(SM) for channel switching;

FIG. 13 illustrates stored structure of the TU-12 data in the switching memory(SM) for channel switching;

FIG. 14 illustrates stored structure of mixed data with the TU-11 and the TU-12 in the switching memory(SM) for channel switching;

DETAILED DESCRIPTION OF THE PREFERRED EMBODIMENTS

The objects, characteristics and advantages of the above-described invention will be more clearly understood through the preferred embodiments referring to the attached drawings.

The terms mentioned later are defined considering the function of the present invention, so, they are changeable according to the intention or usual practice of those skilled in the art, but, the terms may be defined according to the content of the whole specification.

As aforementioned, a generally used time switch stores received data in a switching memory (hereinafter it referred as SM) according to a received order, pre-stores received information in a connection memory (CM) for data switching, sequentially reads the switching information according to order and executes transmitting operation by using data memory address.

Then, the data frame transmitted through the 155.52 MHz STM-1 of a really high speed transmission apparatus multiplexes three units of the same data and transmits, and the received data is operated every 1/3 repetition.

Figure 1:
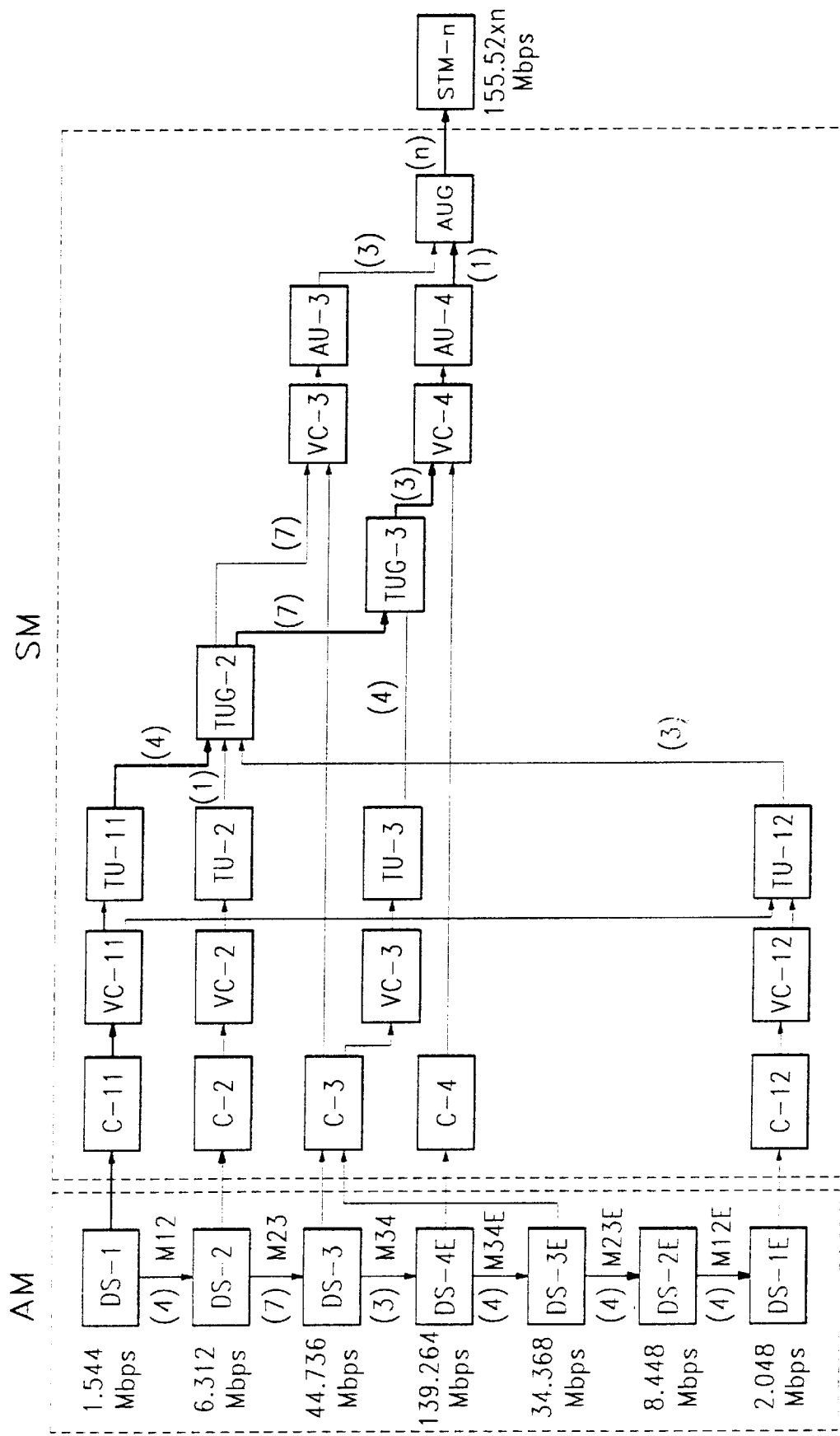
FIG. 1 illustrates a whole aspect of a synchronous multiplexing structure about hierarchy signals in a SDH.
Figure 2:
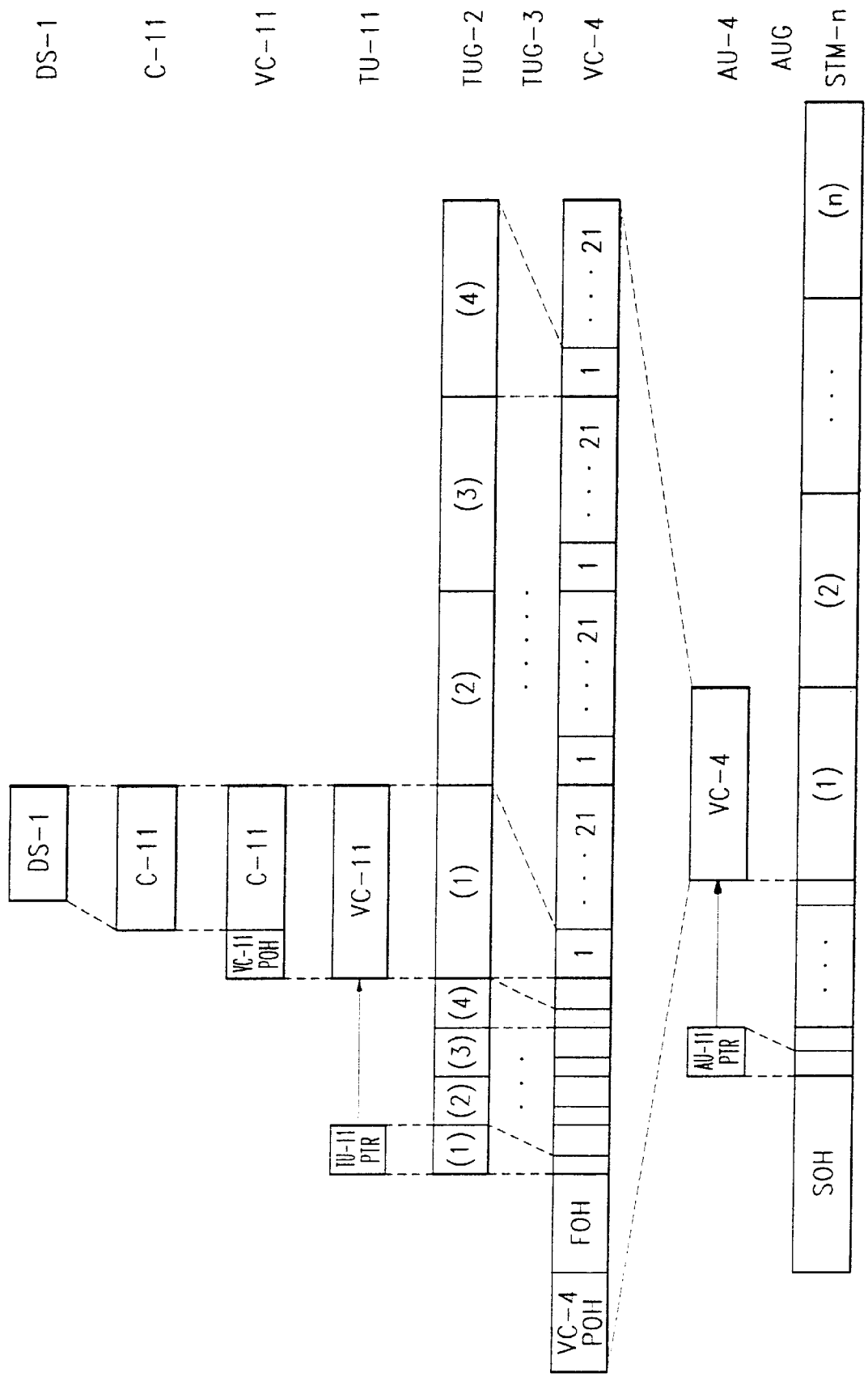
FIG. 2 illustrates a multiplexing process for paths of DS-1/C-11/VC-11/TU-11/TUG-2/TUG-3/VC-4/TU-4/AUS/STM-n in the SDH.
Figure 3:
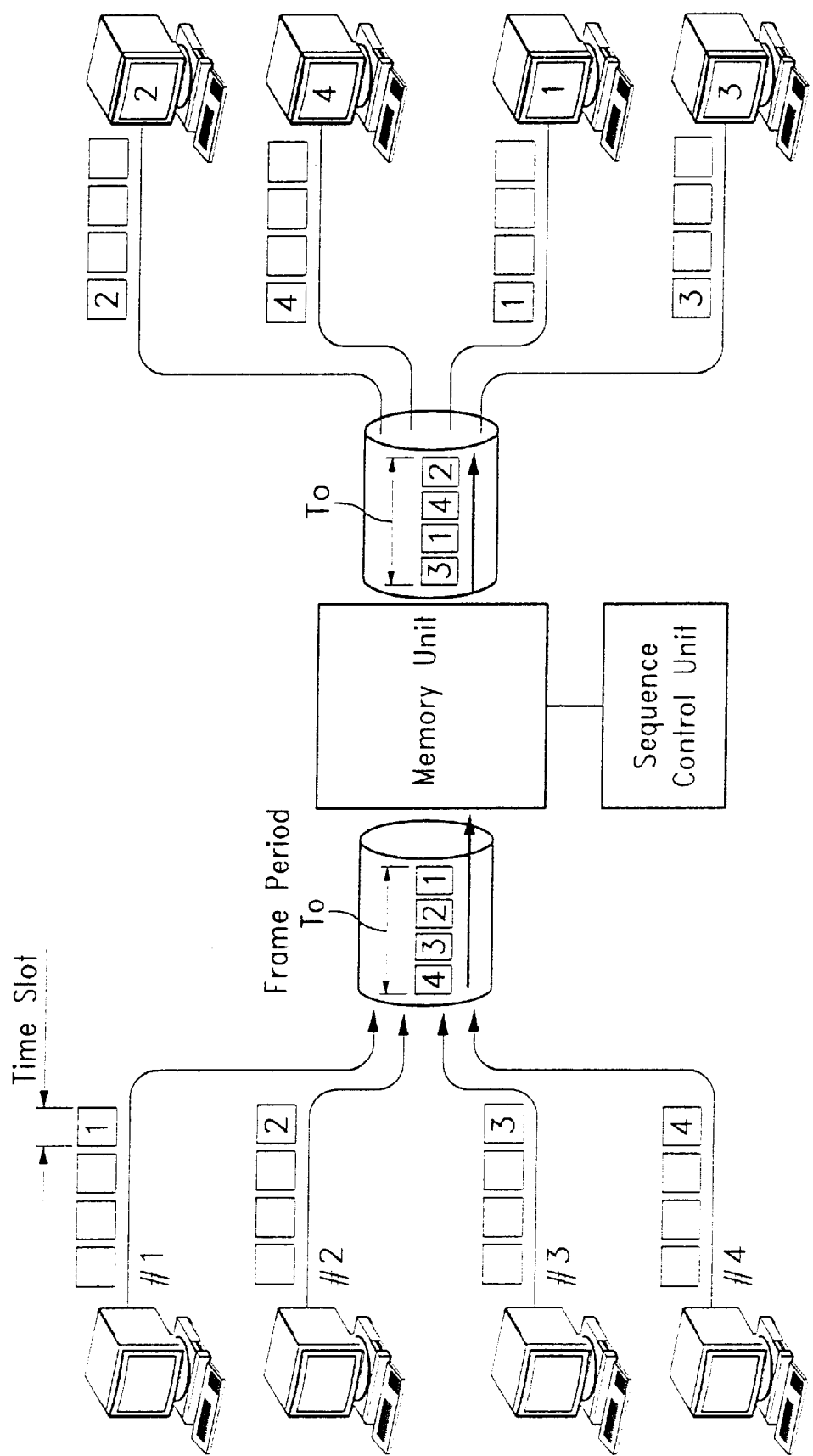
FIG. 3 is a general view illustrating data transmission by multiplexing four lines.
Figure 4:
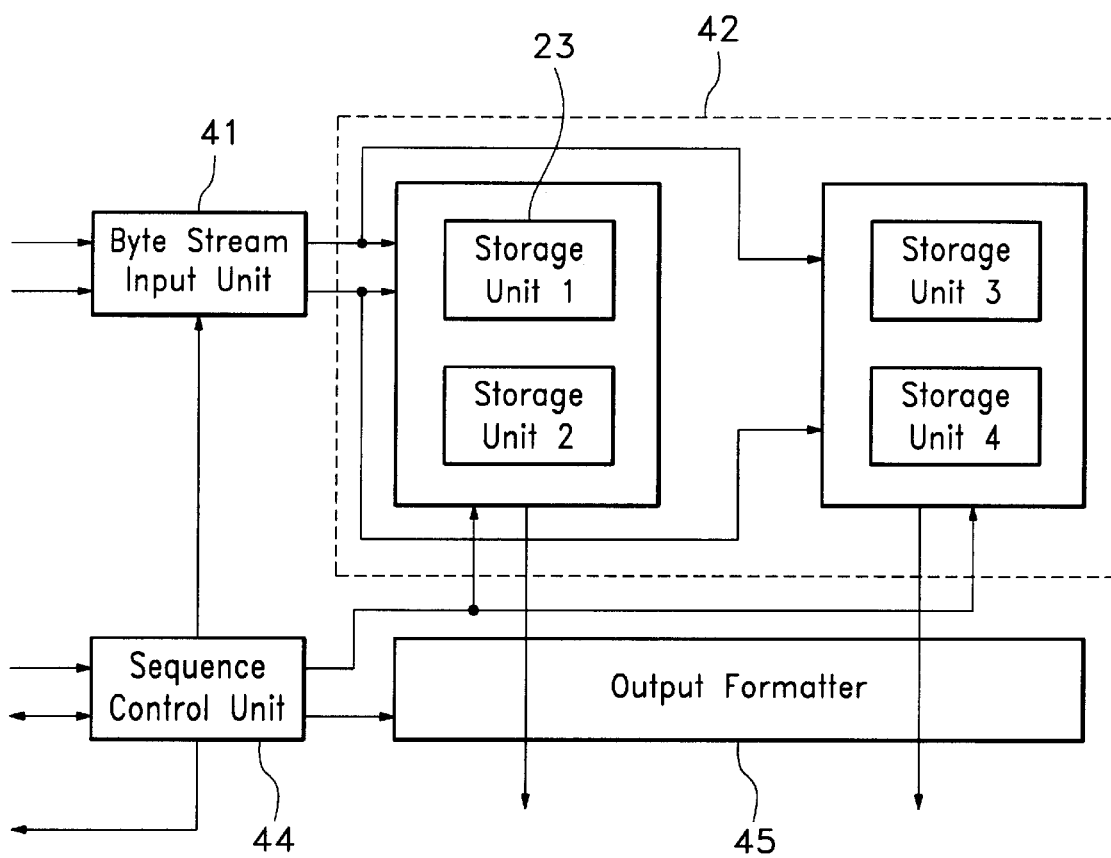
FIG. 4 illustrates system structure of a PM5371 TUDX system of the PMC-Sierra Company that is generally used for a digital switching system.
Figure 5:
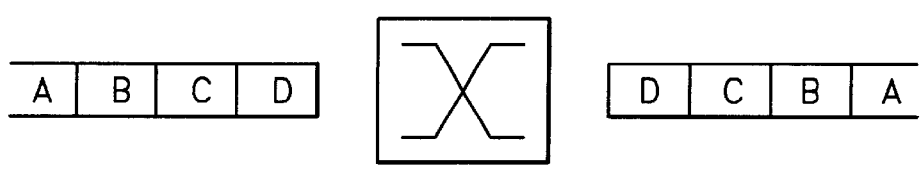
FIG. 5 illustrates a time switching of received data.
Figure 6:
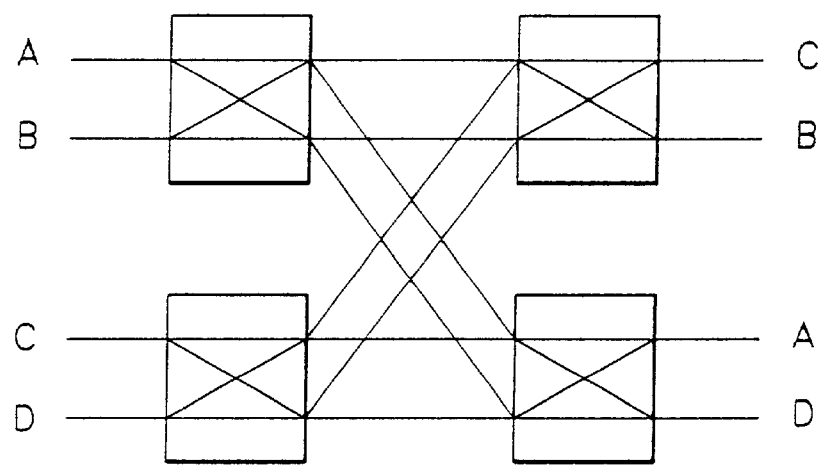
FIG. 6 illustrates structure of a 4-ported switch by using existing 2-ported PMC chips.
Figure 7:
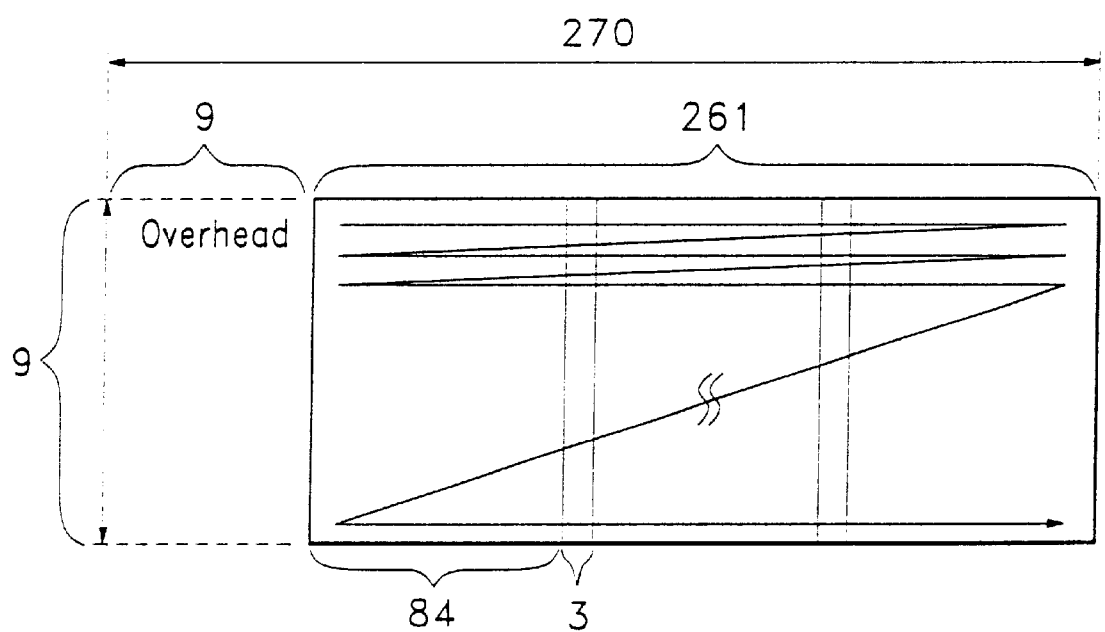
FIG. 7 illustrates real data and overhead structure and reading sequence when one frame consists of an AU3 in a STM-1 transmission method.
Figure 8:
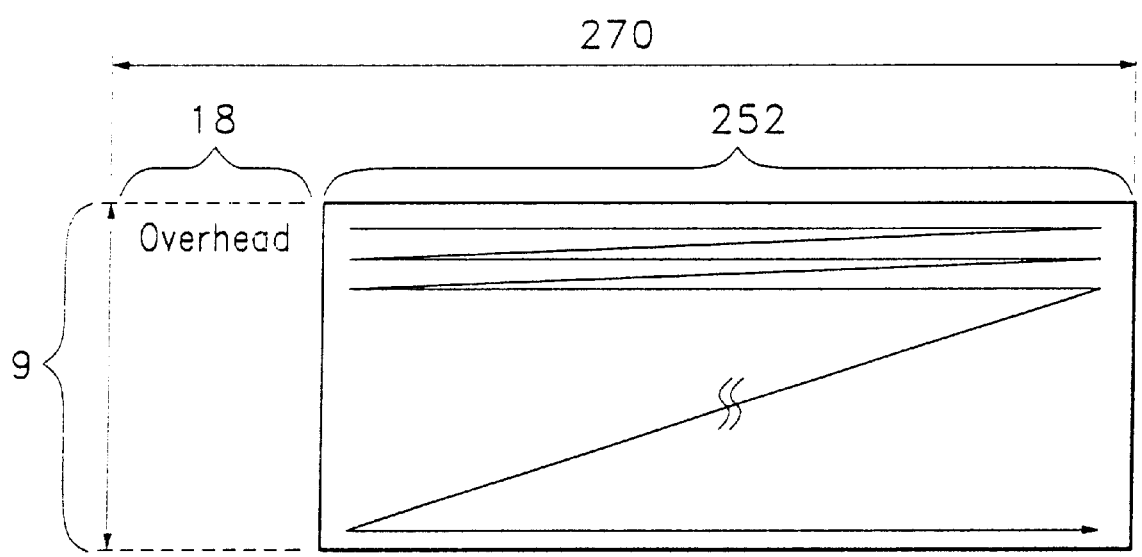
FIG. 8 illustrates real data and overhead structure and reading sequence when one frame consists of an AU4 in the STM-1 transmission method.

The repetition of the received data in detail is described hereinafter. A 9×270 byte-sized unit frame transmitted during 125 us in a STM-1 transmission method and their reading sequence is shown in FIGS. 7 and 8. As shown in FIG. 7, when one frame consists of an AU3, the real data among 9×270 bytes is only 84×3×9 bytes and others consist of information for data transmission. As shown in FIG. 8, when one frame consists of an AU4, the real data among 9×270 bytes are only 252×9 bytes and others consist of information for data transmission. These mean that one frame of the STM-1 consists of 252×9=2268 byte-sized pure data of a subscriber.

Meanwhile, when one frame is transmitted using the same structure of FIGS. 7 and 8, a conventional transmission system executes switching by storing per unit of 270 byte-sized one line in the switching memory for switching each data according to the NNI (network node interface) multi-plexing method of the SDH.

Figure 9:
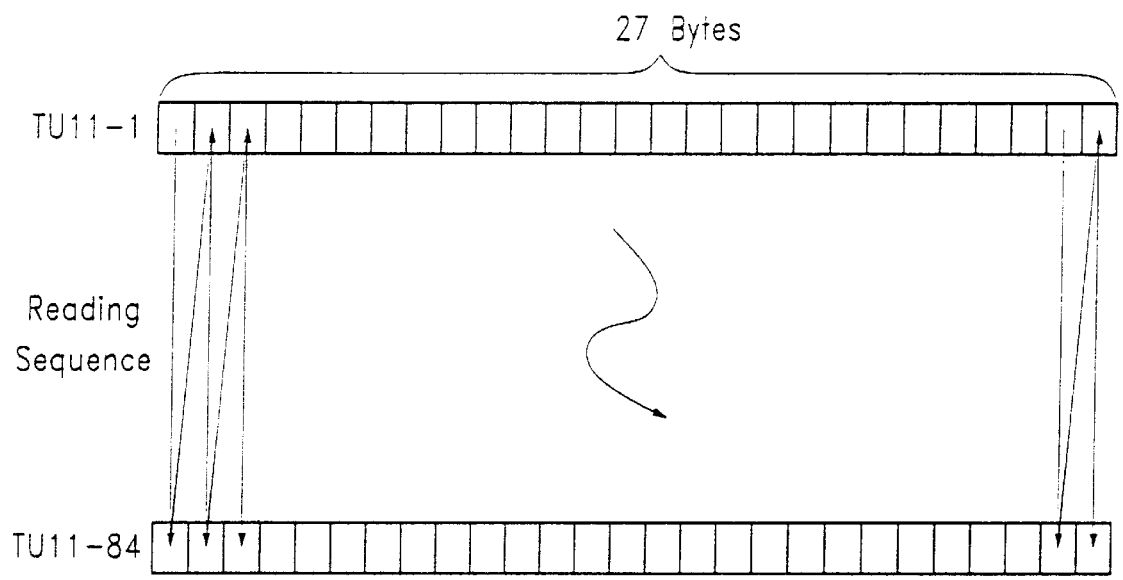
FIG. 9 illustrates a reading process for transmission through the same path per 84 bytes when a byte stream stored in one frame is transmitted to the TU-11 in FIGS. 7 or 8.

At this time, if a stored byte stream is transmitted through a TU-11, the stored byte stream is transmitted through the same path per 84 bytes as shown in FIG. 9. In other words, one frame is consisted of 27 bytes×84 channels (=2268 bytes) and transmitted.

Figure 10:
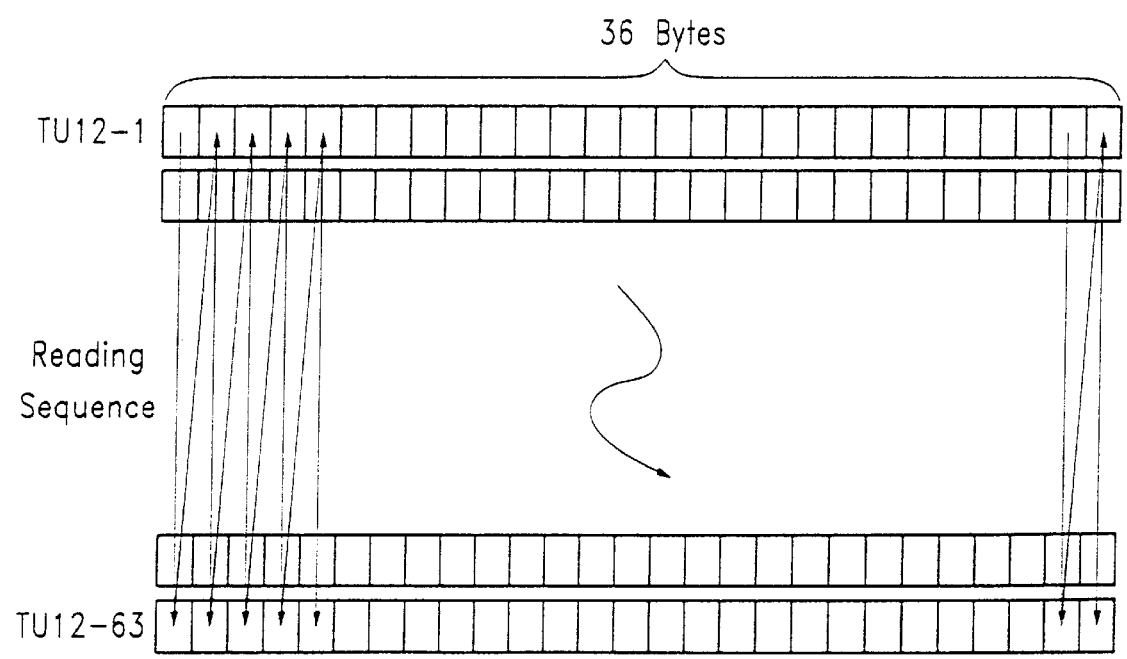
FIG. 10 illustrates a reading process for transmission through the same path per 63 bytes when a byte stream stored in one frame is transmitted to the TU-12 in FIGS. 7 or 8.

Meanwhile, if the stored byte stream is transmitted through a TU-12 of the European transmission type, the stored byte stream is transmitted through the same path per 63 bytes as shown in FIG. 10. In other words, one frame consists of 36 bytes×63 channels (=2268 bytes) and transmitted.

Then, the data of the TU-11 and the TU-12 are read the input frame as shown in FIGS. 9 and 10 and formed.

Figure 11A:
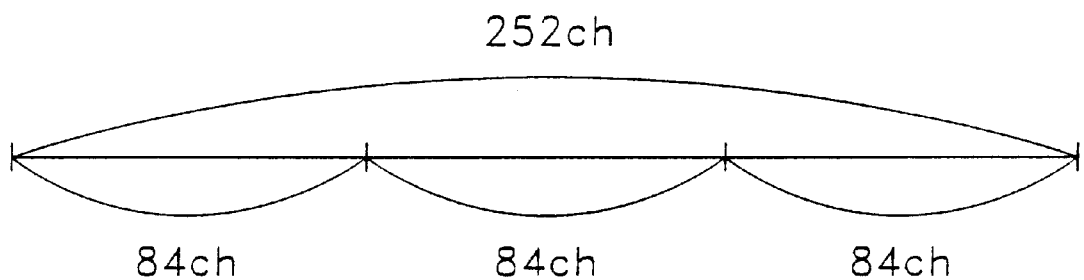
FIG. 11a illustrates switching generation of the TU-11 data in an 84 bytes-sized channel.
Figure 11B:
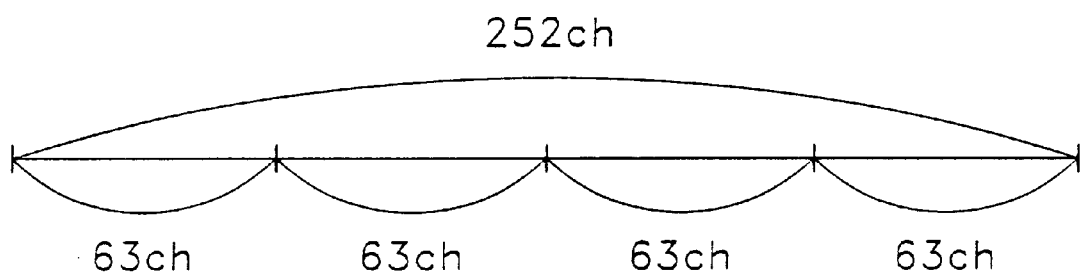
FIG. 11b illustrates switching generation of the TU-12 data in a 63 bytes-sized channel.

Like this, as shown in FIG. 11a, when the data is the TU-11, the quantity of channels is 84 and the switching is generated in 27 byte-sized 84 channels. As shown in FIG. 11b, when the data are the TU-12, the quantity of channels is 63 and the switching is generated in 36 byte-sized 63 channels.

Accordingly, in the TUG-3 of the SDH that transmits data per 84 bytes, the 84-channeled TU-11 data and the 63-channeled TU-12 data are formed with A1 through A84 and B1 through B63 and channel switched as shown in FIGS. 12 and 13, respectively.

Meanwhile, as shown in FIG. 14, for switching channels in the present invention, when the data of one frame are mixed with the TU-11 and the TU-12, the data of the TU-11 are multiplexed four units in the switching memory and stored and the data of the TU-12 are multiplexed three units in the switching memory and stored. In other words, data is stored with the TUG-2 unit.

If the data (byte stream) is stored in the switching memory according to the received sequence, like a conventional method, the received data is mixed up as many types in the present invention.

Accordingly, the received data(byte stream) are stored to the switching memory according to the TUG-2 types of the received data by control of a later-mentioned memory control portion, read by control of the connection information generator and switched the TU-11 and the TU-12 data with a byte unit in the present invention.

Preferably, the predetermined rule includes accessing a switching memory portion that corresponds to a generated address during generation of four count signals, and recording or reading data when the received data type is the TU-11, and accessing a switching memory portion that corresponds to a generated address during generation of three count signals, recording or reading data and channel switching when the received data type is the TU-12.

Finally, the TU-11 and the TU-12 types' data can be switched using two 84 byte-sized switching memories because the TU-12 type data are shifted for adjusting 84 bytes size and stored to the switching memory.

Figure 15:
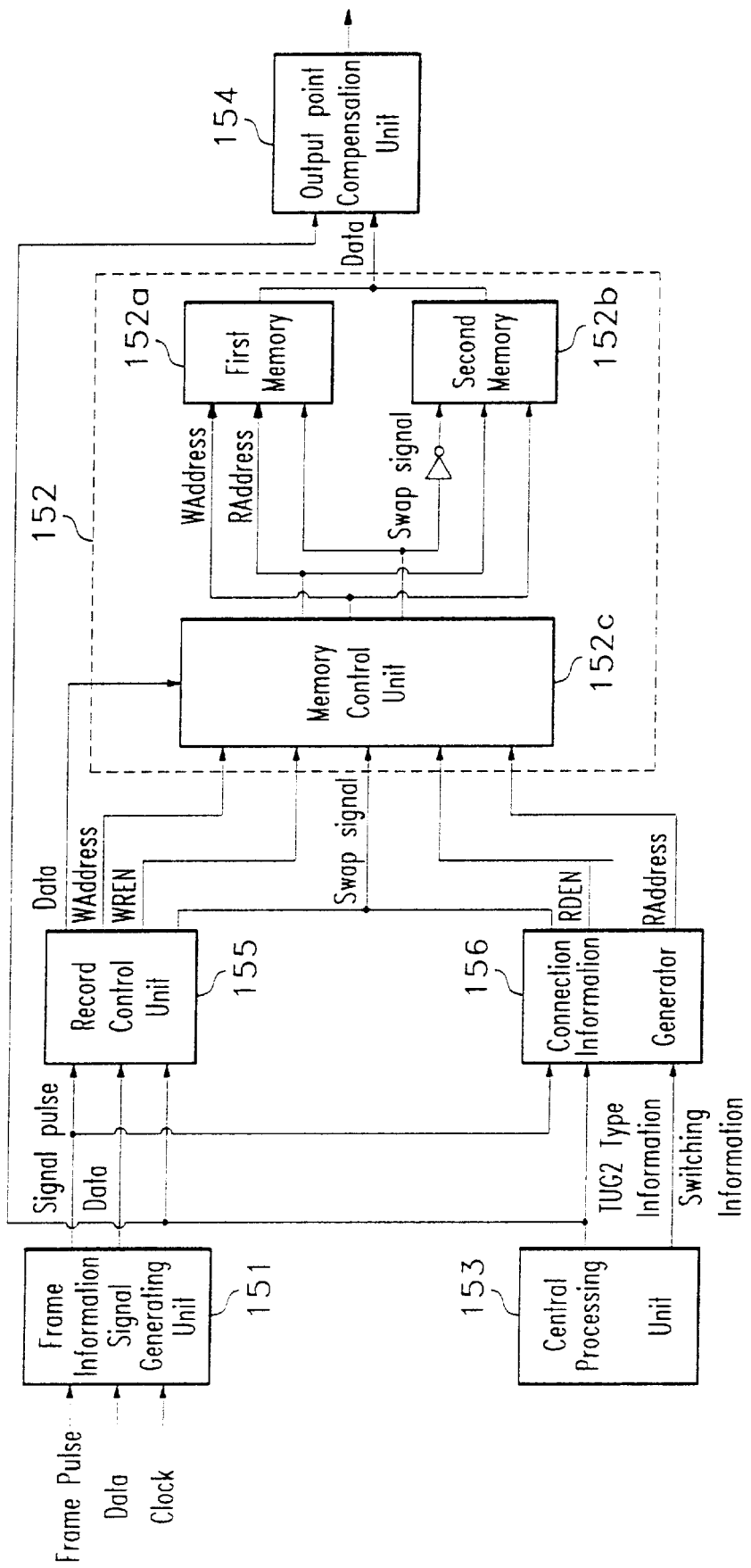
FIG. 15 illustrates the memory saving type time switching circuit of a synchronous super high speed transmission apparatus according to the present invention.

Referring to FIG. 15, the frame information signal generating portion 151 in the memory saving type time switching circuit of a synchronous super high speed transmission receives data that is to be switched and generates count signals for data switching. The record control portion 155 stores received data to the switching memory portion 152 according to the types of data using a predetermined rule. According to the received data types and the switching information from the central processing unit 153, a connection information generator 156 reads the switching memory portion 152 using a predetermined rule and switched data.

Preferably, when the received data type is the TU-11, the predetermined rule includes accessing the switching memory portion 152 that corresponds to a generated address during generation of four count signals and records or reads data. When the received data type is the TU-12, the predetermined rule includes accessing the switching memory portion 152 that corresponds to a generated address during generation of three count signals and records or reads data.

Meanwhile, the output time point compensation portion 154 compensates an output point according to the read data types from the switching memory portion 152 according to the connection information generating apparatus 156.

Preferably, as shown in FIG. 14, to compensate the time difference generated during shifting for adjusting time slot data from three units of the TU-12 type to four units of the TU-11 type, in other words for adjusting time slot data to the TUG-2 type, and recording, the output time point compensation portion 154 outputs after delaying during generation of seven count signals in the TUG-3 level when a read data type from the switching memory portion 152 is the TU-12 and outputs without delaying when a read data type from the switching memory portion 152 is the TU-11.

Meanwhile, the switching memory portion 152 includes 84 byte-sized two memories 152a and 152b and a memory control portion 152c for controlling data recording to the two memories 152a and 152b and data reading. So, it means that the data switching operation is executed per 84 bytes unit from one frame input.

At this time, the memory control portion 152c reads one memory according to the swap signal generated from the record control portion 155 or the connection information generator 156 and exchanges data while it stores another memory between the two memories 152a and 152b.

Figure 16:
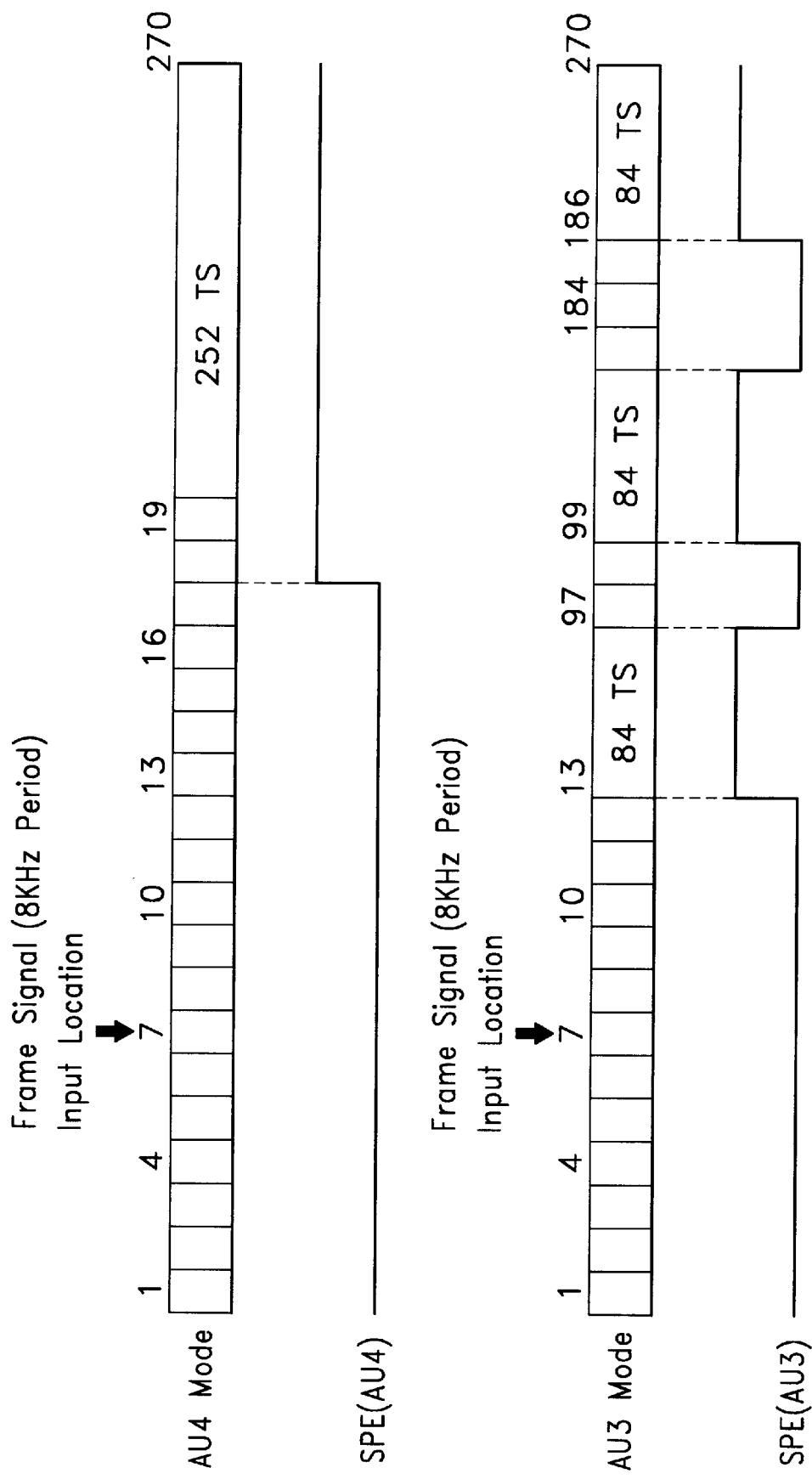
FIG. 16 is a timing chart of a frame signal generated from a frame information generating portion according to the present invention; and, FIG. 17 illustrates a memory swapping process of one TUG-3 according to the present invention.

The operation of the memory saving type time switching circuit of a super high speed transmission apparatus of the present invention is described hereinafter with reference to FIGS. 15 through 17. The frame information signal generating portion 151 generates a real time slot data region for exchanging data and interval signals for demultiplexing to the lower level(TU-11/TU-12/TU-2) according to the STM-1 frame structure as shown in FIG. 16. The real data exchanging point and the region are different because the interval signals are classified into the AU3 and the AU4 modes, but the data size that is really exchanged is the same.

The record control portion 155 divides the data existing in the interval signals generated from the frame information signal generating portion 151 into three units of the TUG-3 type (for example, TUG-3 #1, TUG-3 #2 and TUG-3 #3), the TUG-3 typed time slot data into seven units of the TUG-2 type and the TU-11 typed and the TU-12 typed TUG-2 type information into four units and three units, respectively. In storing the divided data in the switching memory portion 152, the swap signal is inverted once per four times when the data type is the TU-11 and once per three times when the datatype is the TU-12.

The memory control portion 152c accesses the first memory 152a and records data when the received swap signals from the record control portion 155 is high. Simultaneously, the swap memory received at the second memory 152b is low. So, the memory control portion 152c reads time slot data that is corresponding to the RAddress generated from the connection information generator 156. This aforementioned process is called a memory swapping process.

Figure 17:
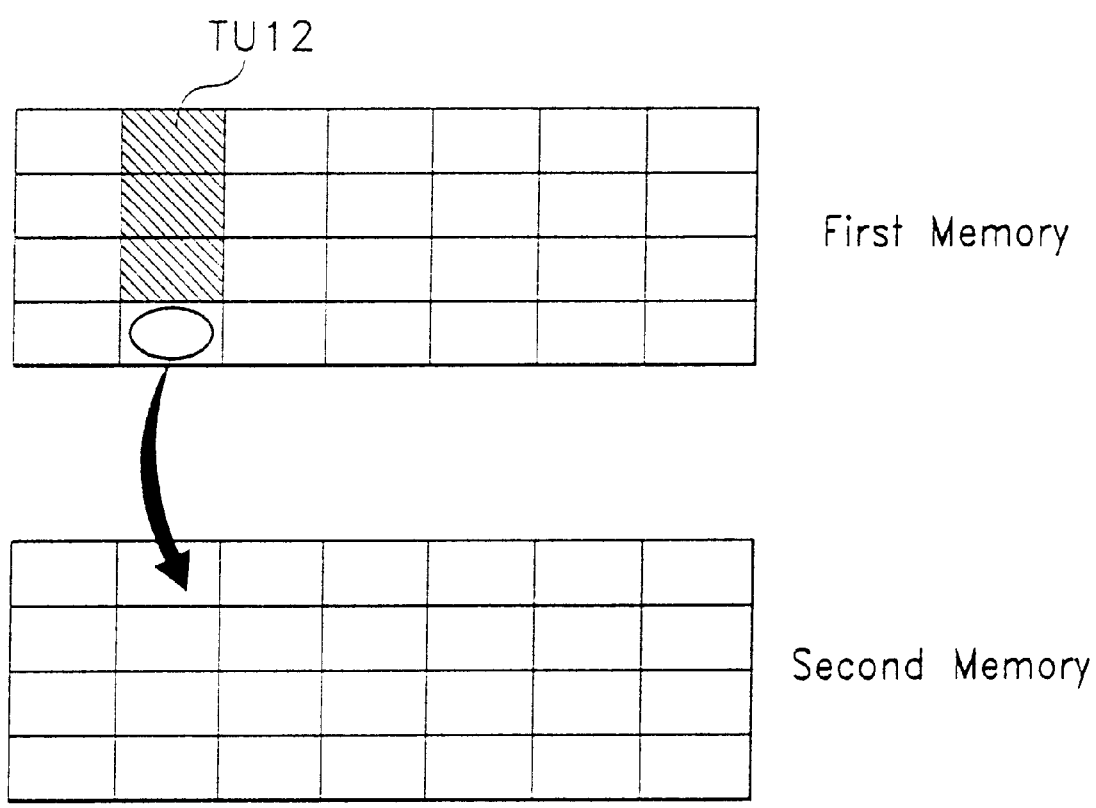

For swapping the same signal in the memory swapping process of one TUG-3 unit with reference to FIG. 17, when the TUG-2 type is the TU-12, the data that is to be received at the last data input location of the first memory 152a is recorded in the second memory 152b. This process is the same as reading the data, so, the data that is corresponding to the RAddress generated from the connection information generator 156 while recording to the first memory 152a is read from the second memory 152b and output.

Then, the TU-12 data are precedently output as seven bytes (TUG-3 level) compared with the real received data stream sequence. This means that 21 bytes are delayed in the point of total STM-1 structure because one unit of the STM-1 is composed of three units of the TUG-3. Moreover, it is easily understood by those who skilled in the SDH.

The output time point compensation portion 154 outputs after delaying during generation of seven count signals in the TUG-3 level when the read data type from the switching memory portion 152 is the TU-12 and outputs without delaying when the read data type from the switching memory portion 152 is the TU-11.

As above-mentioned, according to the present invention by executing data switching considering received data types to the transmission system, the required memory for data switching can be saved, for example, from 270 bytes of a conventional transmission method to 84 bytes of the present invention. So it is an effect of the present invention to optimize the transmission system structure and the operation in one board.

While there have been illustrated and described what is considered a preferred embodiment of the present invention, those skilled in the art will understand it that various changes and modifications may be made, and equivalents may be substituted for elements thereof without departing from the true scope of the present invention. In addition, many modifications may be made to a particular aspect of the present invention without departing from the central scope thereof. Therefore, it is intended that the present invention is not be limited to the particular embodiment disclosed as the best mode contemplated for carrying out the present invention, but that the present invention includes all embodiments falling within the scope of the appended claims.

What is claimed is:

1. A memory saving type time switching circuit of a synchronous super high speed transmission apparatus comprising:

a frame information signal generating portion for receiving data to be switched and generating a count signal for data switching;

a switching memory portion for storing said received data;

a record control portion for storing said received data to said switching memory portion according to a received data type by using a predetermined rule;

a connection information generator for reading said switching memory portion according to type information and switching information of said received data by using said predetermined rule; and, an output time point compensation portion for compensating an output time point according to the type of data read from said switching memory portion.

2. The memory saving type time switching circuit of claim 1, wherein said switching memory portion comprises:

a plurality of memories for storing 84 bytes of said received data; and, a memory control portion for controlling recording data of said plurality of memories and reading data from said plurality of memories.

3. The memory saving type time switching circuit of claim 2, wherein, in said switching memory portion, another memory is read while recording said received data to one memory according to a signal from said memory control portion.

4. The memory saving type time switching circuit of claim 1, said predetermined rule comprising the steps of:

accessing said switching memory portion that corresponds to a first address to be generated during generation of four count signals and recording or reading data when said received data type is a Tributary Unit type 11 (TU-11); and accessing said switching memory portion that corresponds to a second address to be generated during generation of three count signals and recording or reading data when said received data type is a Tributary Unit type 12 (TU-12).

5. The memory saving type time switching circuit of claim 1, wherein said output time point compensation portion compensates time difference generated by shifting for adjusting three time slot data of TU-12 type to four time slot data of a TU-11 type, and outputs according to an output time point compensation rule.

6. The memory saving type time switching circuit of claim 5, wherein one byte data to be read is output after being delayed during generation of seven count signals in Tributary Unit Group 3 (TUG-3) level according to said output time compensation rule.

7. The memory saving type time switching circuit of claim 1, wherein said synchronous super high speed transmission apparatus is an ADM(Add/Drop Multiplexer).

* * * * *